United States Patent
Chan et al.

(10) Patent No.: US 9,326,298 B2
(45) Date of Patent: Apr. 26, 2016

(54) WIRELESS DEVICE BACKGROUND UPLINK SMALL DATA PACKET

(71) Applicant: Verizon Patent and Licensing, Inc., Arlington, VA (US)

(72) Inventors: Yee Sin Chan, San Jose, CA (US); Kalyani Bogineni, Hillsborough, NJ (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 147 days.

(21) Appl. No.: 14/081,114

(22) Filed: Nov. 15, 2013

(65) Prior Publication Data
US 2015/0139081 A1    May 21, 2015

(51) Int. Cl.
| | |
|---|---|
| H04W 72/04 | (2009.01) |
| H04W 72/12 | (2009.01) |
| H04L 29/08 | (2006.01) |
| H04L 12/26 | (2006.01) |
| H04L 12/751 | (2013.01) |
| H04L 29/12 | (2006.01) |

(52) U.S. Cl.
CPC ......... *H04W 72/1268* (2013.01); *H04L 67/145* (2013.01); *H04L 12/2678* (2013.01); *H04L 29/08612* (2013.01); *H04L 43/10* (2013.01); *H04L 45/026* (2013.01); *H04L 61/2553* (2013.01); *H04W 72/1221* (2013.01)

(58) Field of Classification Search
None
See application file for complete search history.

(56) References Cited

U.S. PATENT DOCUMENTS

| | | | |
|---|---|---|---|
| 2013/0242735 A1* | 9/2013 | Koc et al. | 370/232 |
| 2014/0051485 A1* | 2/2014 | Wang et al. | 455/574 |

\* cited by examiner

*Primary Examiner* — Vinncelas Louis (57) ABSTRACT

A communication apparatus includes a wireless transceiver that transmits data packets including background traffic data packets and a transceiver control unit that controls transmission by the wireless transceiver of the data packets. The transceiver control unit receives, prior to their transmission, all data packets that are to be transmitted by the wireless transceiver. The transceiver control unit includes an aggregation unit that aggregates all background traffic data packets received by the transceiver control unit over an aggregation period of a certain maximum duration and causes the wireless transceiver to wirelessly transmit the aggregated background traffic data packets only after the aggregation period has expired.

18 Claims, 4 Drawing Sheets

WIRELESS DEVICE BACKGROUND UPLINK SMALL DATA PACKET

BACKGROUND

Background traffic is the autonomous exchange of user plane (also called data plane, forwarding plane, carrier plane or bearer plane) data packets between a wireless device and a network, generally in the absence of a specific contemporaneous user interaction with the device. Background packets often arise due to open applications or processes that remain resident in the device memory and which require the exchange of data on a regular or intermittent basis with peer entities within the network. Examples of background traffic include: so-called "keep alive" behaviors in which the application will, without specific contemporaneous user input, periodically message a remote server associated with the application to keep alive the connection of the application with the server (e.g., a social media application may keep a user logged in and connected to the central server even when the application is not currently being used by the user); tracking functions which, without specific contemporaneous user input, periodically report location information to a remote server (e.g., the updating of weather or traffic status information based on a physical location); and push-pull functions that, without specific contemporaneous user input, periodically request data (pull) and/or receive data (push) from remote servers (e.g., stock applications, news applications, messaging applications, etc., which periodically check for updates ("pull") from a server and/or have updates "pushed" to them from the server).

Background traffic generally consists of relatively small data packets, and the background traffic data packets of a given wireless device are generally dispersed over time. The overall volume of background traffic handled by the network across an extended time period is generally low when compared to the overall volume of non-background user plane traffic handled over the same time period. However, because the background traffic data packets are generally dispersed over time, the background traffic often requires a significant amount of control-plane network signaling to support repeated connection requests from the wireless device to convey the background traffic data packets from the wireless device to the network. For example, under certain circumstances the wireless device may become Idle in between each instance of background traffic, in which case the wireless device would have to make a separate connection request for each instance of background traffic. Each such connection request generally requires various control-plane network signaling processes regardless of the volume of traffic that will ultimately be transmitted over the connection. As a result, background traffic places a significant load over time on network resources, particularly if a single device has numerous applications requiring intermittent connectivity, which is then combined with all such devices on the network. In addition, the amount of control-plane network signaling associated with background traffic is generally disproportionately large in consideration of the volume of the transmitted background traffic data packets—that is, control-plane network signaling resources are being disproportionately utilized by background traffic.

There are consequences to the specific wireless device as well. It must transition to a Connected mode to transmit the background traffic, thereby creating a drain on battery charge. The repeated transitions from Idle mode to Connected mode and back to Idle mode and so on as a result of background traffic over time cumulatively results in a noticeable diminishing of battery charge.

Therefore, with the widespread use of smartphones and the increase in both the number and variety of the applications, background traffic can significantly impact network efficiency and capacity in daily network operation. Background traffic can also impact the performance of the wireless device in terms of both occupying wireless communication resources and draining battery charge.

BRIEF DESCRIPTION OF THE DRAWINGS

FIGS. 4A and 4B illustrate examples of transmitting background traffic data packets and resulting RRC mode changes in the wireless device.

DETAILED DESCRIPTION

A wireless device may include an aggregation mechanism that may aggregate at the radio layer various desired instances of background traffic into a single aggregate instance of background traffic. For example, the aggregation mechanism may hold at the radio layer all instances of background traffic that are generated by various applications on the wireless device within a predetermined time period, and at the end of the time period may transmit all of the instances of held background traffic as a single aggregate instance of background traffic. The amount of control-plane network signaling associated with the aggregated background traffic may be much smaller than the amount of control-plane network signaling that would have been associated with sending the instances of background traffic separately (although the total volume of user-plane data that is transmitted is not necessarily reduced). This reduction in control-plane network signaling is achieved, for example, because only one connection request may be required for the aggregate instance of background traffic, whereas multiple connection requests might have been necessary had the various instances of background traffic been sent individually (potentially a separate connection request for each instance of background traffic, depending on the circumstances). Thus, aggregating the connection requests saves significant network resources by decreasing the number of connection requests generated from background traffic. Furthermore, only one transition from Idle mode to Connected mode is required for the aggregated instance of background traffic, whereas multiple transitions from idle mode to connected mode might have been necessary had the various instances of background traffic been sent individually. Thus, aggregating the connection requests reduces drain of battery charge by decreasing the number of transitions from Idle mode to Connected mode resulting from background traffic. Moreover, by aggregating the background traffic at the radio layer (as opposed to, for example, aggregating at the application layer), uniformity of utilization of the aggregation mechanism may be enhanced and greater control by the network operator may be facilitated.

Figure 1:
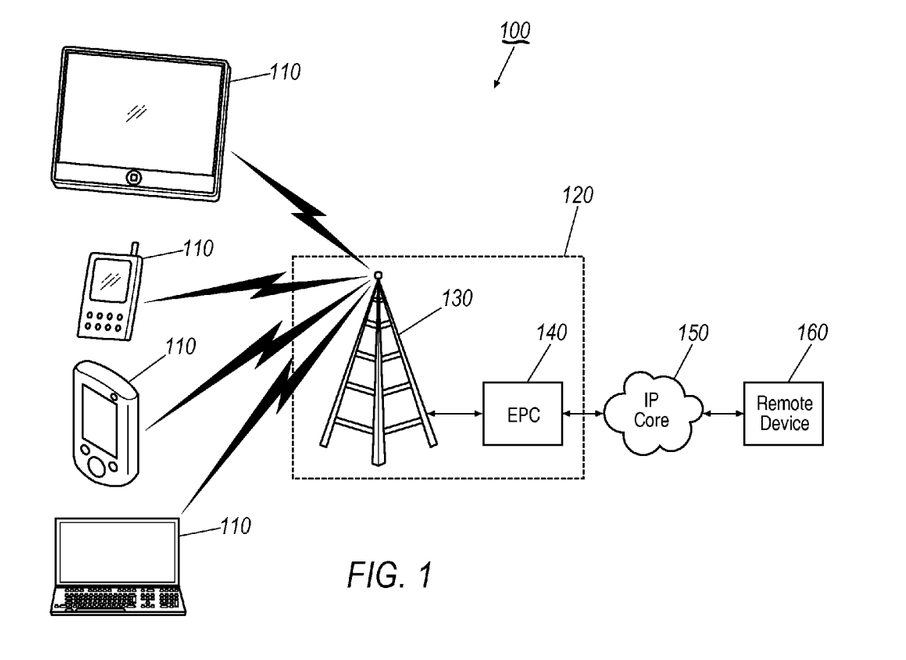
FIG. 1 illustrates an exemplary system for wireless communication.

FIG. 1 illustrates an exemplary system 100 having wireless devices 110, a network 120 including a radio access network 130 and a core network 140, an Internet Protocol ("IP") core network 140, and a remote device 150. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

As illustrated in FIG. 1, system 100 includes a plurality of wireless devices 110. A wireless device 110 may be any device capable of communicating wirelessly with the network 120 and capable of generating background traffic (e.g., capable of running an application or OS that generates background traffic), including cellular phones, tablets, personal computers, and personal digital assistants, among other exemplary devices.

The network 120 may include any network capable of wirelessly sending/receiving data packets to/from the wireless devices 110, as well as communicating data packets between the IP core network 150 and the wireless devices 110. For example, the network 120 may be a Fourth Generation (4G) wireless network, as defined by the 3rd Generation Partnership Project (3GPP) standardization, which may implement an Evolved Packet System architecture.

The network 120 includes a radio access network 130 that communicates wirelessly with the wireless devices 110 and also communicates with the core network 140. When the network 120 is a 4G wireless network, the radio access network 130 may be a Long Term Evolution (LTE) network.

The core network 140 connects the wireless access network 130 to the IP core network 150, and also provides various control-plane functionalities. For example, the core network 140 may control attachment of wireless devices 110 to the network 120, perform authentication procedures, keep track of subscriber information, control routing of various data flows, etc. When the network 120 is a 4G wireless network, the core network 140 may be an Evolved Packet Core (EPC) network.

The IP core network 150 may be any packet-switched network, such as, for example, the Internet.

The remote device 160 is connected to the IP core network 150. The remote device 160 may be a computing device such as, for example, a server that hosts a webpage or a server associated with an application that is resident on the wireless device 110 (e.g., a Twitter™ server). The wireless devices 110 and the remote device 160 may communicate with each other via the network 120 and the IP core network 150.

As noted above, the network 120 may be a 4G wireless network and may include an LTE network as the wireless access network 130 and an EPC as the core network 140. An LTE network 130 may include one or more eNode B nodes (eNB nodes), which are in communication with the EPC 140 and with one or more of the wireless devices 110. The EPC 140 may include a Mobility Management Entity (MME), a Serving Gateway (SGW), and a Packet Data Network gateway (PGW), and may be in communication with an IP Multimedia Subsystem (IMS) and the IP core network 150. The physical locations of each component of the EPC 140 may be remote from one another. The eNB nodes of the LTE wireless access network 130 combine the functionality of both base station and radio access controllers (RNC) of 2G or 3G radio access networks. The eNB nodes may accordingly support the LTE network 130 air interface and may include functions for radio resource control, user plane ciphering and packet data convergence protocol (PDCP).

As mentioned above, the EPC 140 may include a MME, a SGW, and a PGW. The MME may be configured to manage mobility information, wireless device 120 identities, and security parameters. The SGW may be configured to operate as a gateway between the EPC 140 and the LTE network 130. The PGW may be configured to operate as the gateway between the EPC 140 and the IP core network 150. The MME may further be configured to perform control-plane functionality, as compared to the SGW and PGW, which may be configured to perform bearer-plane (also referred to as "user-plane") functionality. Control-plane functionality includes protocols and communications paths used to configure the network to meet wireless device demand for data services, such as the establishment of connections, the control of attributes, the routing or re-routing of established connections, and the assignment and reassignment of resources to wireless devices 110. Bearer-place functionality includes protocols and communications paths configured to transmit the requested data services, such as to transmit Voice over Internet Protocol (VoIP) and/or video session data.

Figure 2:
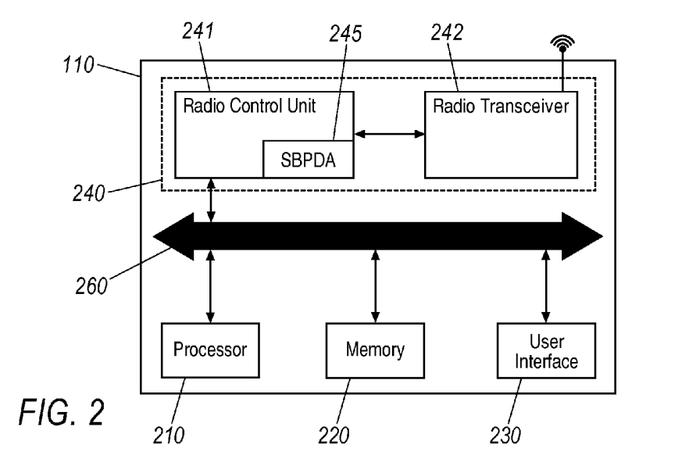
FIG. 2 illustrates an exemplary wireless device.

FIG. 2 illustrates an exemplary wireless device 110 having a processor 210, a memory 220, a user interface 230, a bus 260, and a wireless communications unit 240 that includes a radio control unit 241 and a radio transceiver 242. The wireless device 110 may take many different forms and include multiple and/or alternate components and facilities. While an exemplary wireless device 110 is shown in FIG. 2, the exemplary components illustrated in FIG. 2 are not intended to be limiting. Indeed, additional or alternative components and/or implementations may be used.

The processor 210 may control operation of the wireless device 110 and execute various programs. The memory 220 may include one or more persistent and/or volatile memories and may have stored thereon program code executable by the processor 210, for example program code for an operating system ("OS") of the wireless device 110, program code for drivers for various components and/or peripherals, program code for various applications, etc. The user interface 230 may be configured to receive user input (e.g., keyboard input, touchscreen input, voice input, etc.) and to generate output for the user (e.g., visual display, audio, etc.). The radio control unit 241 may be configured to control operation of the radio transceiver 242, which receives and transmits data wirelessly between the wireless device 110 and the network 120. It will be understood that "radio" is merely used for convenience to denote all forms of wireless communication, and that the radio control unit 241 and radio transceiver 242 are not limited to wireless transmission via waves with wavelengths in the radio region of the electromagnetic spectrum. The communications bus 260 facilitates communication between the various components of the wireless device 110; however, other forms of communication connections between all or some of the components in addition to or in lieu of the communications bus 260 are possible, such as direct individual connections between components.

The wireless communications unit 240 may include a combination of hardware and software configured as discussed further below. For example, the wireless communications unit 240 may be a communications chipset including various hardware and software. The wireless communications unit 240 may include a dedicated processor (not illustrated) for executing the functions discussed below, may utilize the processor 210 for executing the functions, or may utilize both a dedicated processor and the processor 210 in varying capacities. The radio control unit 241 may receive data packets that are intended to be transmitted by the radio transceiver 242 to the network 120. For example, applications resident in the memory 220 that are being executed by the processor 210 may need to communicate with the network 120 and therefore may generate connection requests and data packets associated therewith for transmission to the network 120, which data packets will be sent by the applications to the radio control unit 241 for processing and transmission. The radio control unit 241 may initiate transmission protocols to enable the data packets to be transmitted, and may control the operation of the radio transceiver 242. The data packets may be of a variety of types and the radio control unit 241 may apply different protocols depending on the type of data packet being sent. The radio control unit 241 may be implemented via hardware, software, or a combination of hardware and software. For example, the radio control unit 241 may be provided as firmware on a chipset that includes the radio transceiver 242.

The radio control unit 241 may include a small background packet data aggregator (SBPDA) 245. The SBPDA 245 may be configured to aggregate background data packets. For example, the SBPDA 245 may determine whether data packets received by the radio control unit 241 are background data packets, and may hold background data packets for a period of time rather than causing the radio transceiver 242 to transmit such data packets immediately as they are received. The held background data packets may be stored in any convenient storage unit, such as a memory included in the radio control unit 241 (not shown), or the memory 220 of the wireless device. After the period of time has elapsed, the SBPDA 245 may cause the radio transceiver 242 to transmit together all of the background data packets that have been held by the SPPDA 245 during the period of time. It will be understood that the use of "aggregate" and "aggregation" herein does not necessarily imply (or exclude) a literal combining of the data packets into a new entity, but instead merely implies that the data packets are transmitted together. Moreover, transmission of the packets "together" does not necessarily imply (or exclude) literal simultaneous transmission of the packets, but instead merely implies that the data packets are transmitted in relatively close temporal succession—in particular, the data packets are transmitted close enough in time to each other that the wireless device does not transition to an RRC Idle mode (discussed further below) between transmission of a first one of the held data packets and transmission of a second one of the held data packets.

Figure 3:
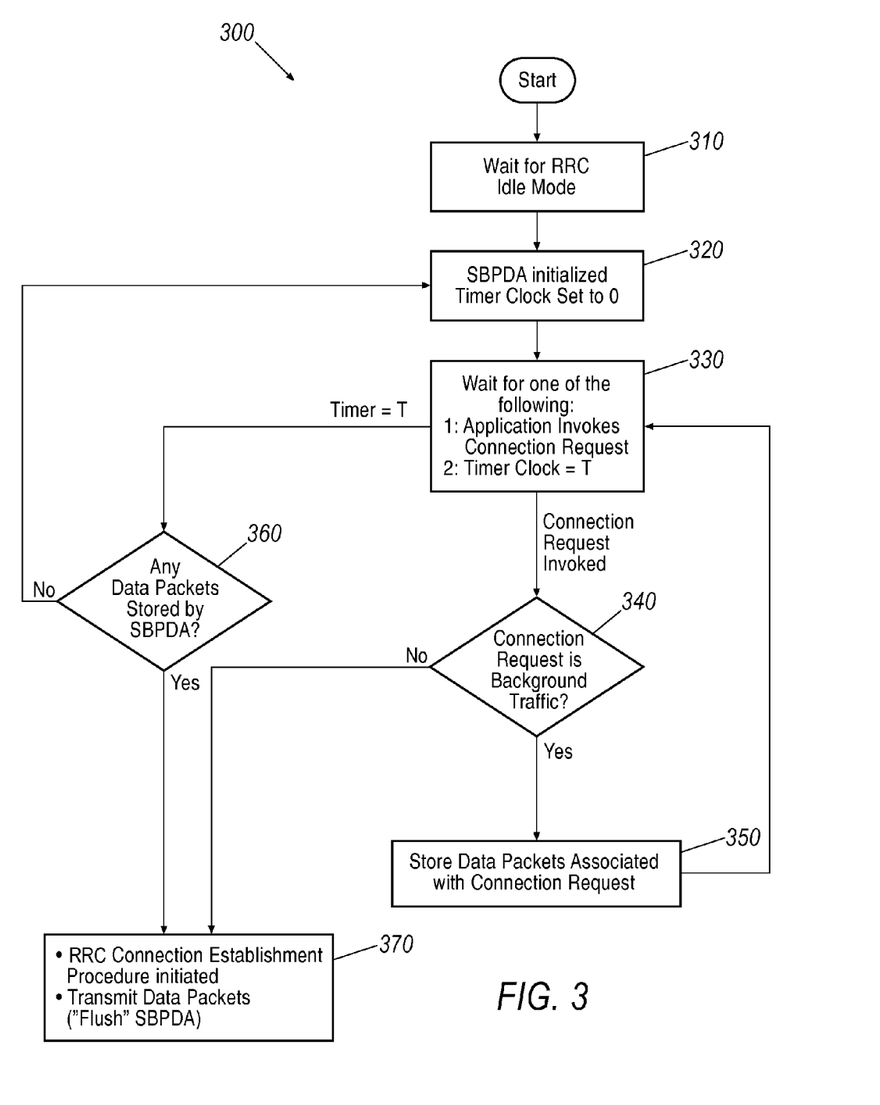
FIG. 3 illustrates an exemplary process for aggregating background traffic data packets.

FIG. 3 illustrates an exemplary process whereby the SBPDA 245 may aggregate background traffic. The process begins, and in block 310 the SBPDA 245 waits until the wireless device 110 enters the RRC Idle mode. If the wireless device 110 has entered the RRC Idle mode, the process proceeds to block 320.

In block 320 the SBPDA 245 is initialized and a SBPDA timer clock is set to zero. The process then proceeds to block 330.

In block 330 the SBPDA 245 waits until one of two triggering events occurs: (1) an application sends a connection request for transmission of data to the radio control unit 241, in which case the process proceeds to block 340, or (2) the timer clock value equals T, in which case the process proceeds to decision block 360. Although for simplicity only these aforementioned two triggering events are illustrated in FIG. 3, it is possible to include additional and/or alternative triggering events that result in proceeding to either of blocks 340 or 360. For example, if a memory/buffer area allocated for holding the aggregated background traffic becomes full (or passes a predetermined capacity, such as 90% full), the SBPDA 245 may be flushed prior to the timer clock reaching T in order to avoid overflowing the memory area. Although not illustrated, if such an additional triggering event were added to the block 330, the process could proceed similarly as illustrated in the case when the timer clock value equals T. As another example, the duration of the aggregation period may be determined by an amount of background traffic that has been aggregated instead of (or in addition to) by a set amount of time T. In such an example, if an amount of background traffic being held by the SBPDA 245 reaches a predetermined threshold D, the process may proceed to block 360. If such a triggering event were included, alterations could be made to other steps as appropriate to enable tracking of the event (e.g., in block 320 a counter could be reset, wherein the amount of background traffic is determined by reference to the counter, in block 350 the counter could be incremented, etc.). The aforementioned "amount of background traffic" could be either a physical amount of held data (e.g., 100 Mbits), or could simply be the number of instances of held background traffic regardless of the amount of data associated therewith (e.g., 20 instances of background traffic). The value of such a predetermined threshold D may be set by the same means and based on similar considerations as those discussed below for the value T, with a high predetermined threshold D corresponding to a high value of T and a low predetermined threshold D corresponding to a low value of T.

In decision block 340 it is determined whether the connection request is background traffic. For example, if the request was user-initiated (e.g., generated as a result of specific user input, such as a user attempting to open a webpage with a web-browser application) then the request might not be background traffic, whereas if the request was background-application-initiated then the requests might be background traffic. The SBPDA 245 may receive the aforementioned information about the request from the processor 210, or even from the requests themselves. For example, the SBPDA 245 may be notified by the processor 210 that specific requests are and/or are not background traffic requests. As another example, the SBPDA 245 may be notified by the processor 210 which applications are running in the background and/or which applications are running in the foreground (in some embodiments, all requests from applications running in the background may be assumed to be background traffic requests, unless specifically indicated otherwise). As another example, the requests themselves may include data indicating to the SBPDA 245 whether or not they are background traffic. If the request is not background traffic (decision result=NO), then the process proceeds to block 370. If the request is background traffic (decision result=YES), then the process proceeds to block 350.

In block 350 the SBPDA 245 stores the data packets associated with the connection requests. The process then returns to block 330, and the SBPDA 245 continues to wait for any further connection requests or for the timer clock value to become T.

In decision block 360 it is determined whether any data packets have been stored by the SBPDA 245. If data packets have been stored by the SBPDA 245 (decision result=YES), then the process proceeds to block 370. If no data packets have been stored by the SBPDA 245 (decision result=NO), then the process returns to block 320 in which the clock is reset to 0.

In block 370 the radio control unit 241 causes the radio transceiver 242 to initiate the RRC Connection Establishment procedure (discussed further below), which transitions the wireless device 110 from RRC Idle mode to RRC Connected mode and establishes a radio connection with the network 120, and then causes the radio transceiver 242 to transmit together all of the data packets stored by the SBPDA 245 and/or any data packets associated with a non-background traffic connection request (resulting from a negative determination in decision block 340). Upon transmission of the data packets stored by the SBPDA 245, the SBPDA 245 storage is cleared (e.g., the SBPDA 245 is "flushed"). The process then repeats itself as the process returns to block 310 to wait for the wireless device to again enter the RRC Idle mode. Although not illustrated, the process may end upon the occurrence of any predetermined event, such as when the device powers down. As noted above, the block 370 is reached and the SBPDA 245 is flushed when either the predetermined time T has elapsed, or when a non-background request is received. That is, a user-initiated connection request is processed immediately without being held until the time T has elapsed, since it may be undesirable to unduly delay a user-initiated connection request. Because the wireless device 110 is already in the RRC Connected mode immediately after transmitting the user-initiated request, any background traffic requests that have been held up until that point can advantageously be transmitted at that time without requiring any further RRC mode transition. Thus, the SBPDA 245 is flushed after a user-initiated connection request even when the time T has not yet elapsed.

RRC Idle and RRC Connected modes, mentioned above, will be described hereinafter in greater detail. A wireless device 110 configured for use with a 4G LTE network may have two RRC connection modes: an RRC Idle mode and an RRC Connected mode. Transitioning between these two RRC modes requires certain control-plane network signaling. For simplicity, hereinafter the only example of control-plane network signaling resulting from background traffic that will be discussed in detail is the network signaling associated with transitions between RRC Idle mode and RRC Connected mode; however, control-plane network signaling resulting from background traffic is not necessarily limited only to the signaling associated with RRC mode transitions.

In the RRC Idle mode there is no active air-interface (radio) connection established between the wireless device 110 and the LTE network 130, although the wireless device 110 in RRC Idle mode is not necessarily detached from the network entirely (e.g., the wireless device 110 might be maintained in a "Registered" state in the MME as a result of a prior attachment procedure). In the RRC Connected mode a radio connection is established between the wireless device 110 and an eNB of the LTE network 130. The wireless device 110 must transition from an RRC Idle mode to an RRC Connected mode and establish a radio connection before transfer of any data between the wireless device 110 and the network 120 may occur. In order to make the transition from RRC Idle mode to RRC Connected mode, an RRC Connection Establishment procedure is used, which includes various control-plane radio communications between the wireless device 110 and an eNB node of the LTE network 130. In particular, as part of the RRC Connection Establishment procedure: a RRC Connection Request may be sent from the wireless device 110 to the eNB node, a RRC Connection Setup message may be sent from the eNB node to the wireless device 110, and a RRC Connection Setup Complete message may be sent from the wireless device 110 to the eNB. These communications between the wireless device 110 and the eNB as part of the RRC Connection Establishment procedure are examples of the aforementioned control-plane network signaling associated with RRC mode transitions, and which might result from background traffic.

Generally, if a period of time of a predetermined duration (often called the "Idle Tail") passes without any radio transmission/reception activity, the wireless device 110 will transition back to the RRC Idle mode. This period of time is generally determined by the network 120. When a wireless device 110 is in the RRC Connected mode, network resources are reserved for the device (e.g., scare radio bandwidth resources); thus, if a wireless device 110 is in the RRC Connected mode but is not transmitting/receiving any data, the reserved network resources are likely being wasted and might be more advantageously allocated somewhere else. To free up these potentially wasted resources, the network 120, for example, may cause the idle wireless device to "disconnect" by transitioning back to the RRC Idle mode. For example, after a last instance of radio communication, a timer may start. If another radio communication occurs between the wireless device 110 and the network 120 before S has elapsed, then the timer may be reset at the end of that communication. If, on the other hand, the timer reaches S without another communication occurring, then the wireless device 110 may be caused to transition to RRC Idle mode. As one possible example, the eNB node of the LTE network 130 may keep the timer and may send a RRC Disconnect signal to the wireless device 110 in order to cause the wireless device to transition to the RRC Idle mode. The network 120 may set the duration of S, and may determine the value of S based on any relevant considerations. A lower value of S results in disconnecting wireless devices more quickly after they become idle, thus potentially freeing-up more radio resources. However, if the value of S is set too low, then even temporary lapses of data transmission might result in disconnection of the wireless device 110 (even if such lapses are not indicative of the wireless device actually being idle). Merely as one possible example, S is generally set in 4G LTE networks to a value on the order of one second to a few seconds.

If a time period less than S passes between subsequent instances of background traffic, then no additional RRC mode transition is required to transmit the second instance of background traffic, since the wireless device 110 is already in the RRC Connected mode when the second instance is generated. However, because background traffic is generally intermittent and distributed in time, a time greater than S often passes between at least some instances of background traffic. Thus, the wireless device 110 may transition back to RRC Idle mode in between at least some instances of background traffic. Moreover, background traffic is often repeated, and therefore repeated transitions between RRC Idle and RRC Connected modes may occur as a result of background traffic, with each transition utilizing control-plane network signaling resources as well as draining battery charge from the wireless device. Maximum RRC transitions occur in the case where the interval between each instance of background traffic is regular and slightly greater than S, resulting in each instance of background traffic causing a transition from RRC Idle mode to RRC Connected mode. Although the case of maximum transitions is possible, it is more likely that the background traffic will be generated at somewhat irregular timings, resulting in a number of RRC transitions similar to that modeled in FIG. 5 (discussed further below).

Figure 4A:
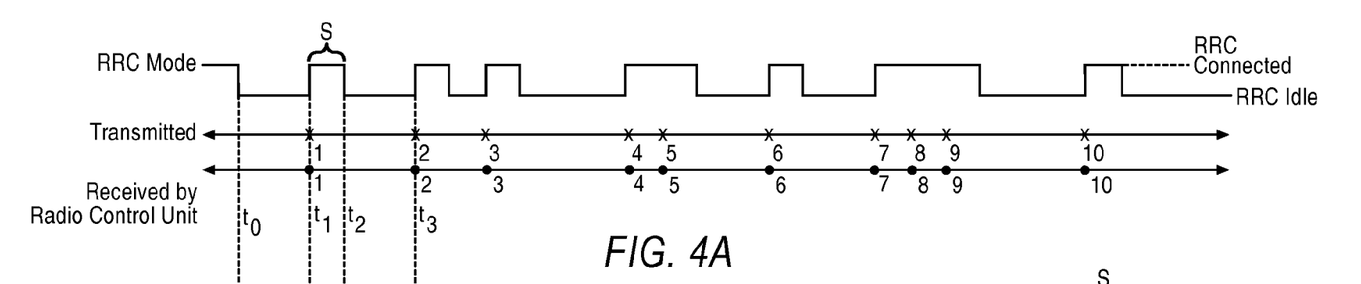
FIG. 4A illustrates an exemplary case in which aggregation is not performed.
Figure 4B:
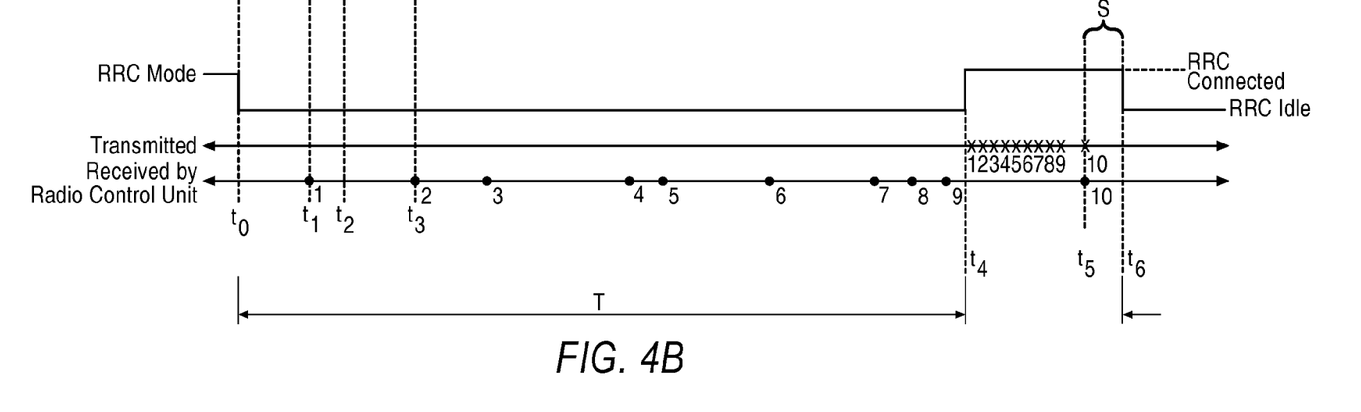
FIG. 4B illustrates an exemplary case in which aggregation is performed.

By aggregating the background traffic for a period of time T, where T is greater than S, the number of transitions between RRC Idle mode and RRC Connected mode may be decreased. FIGS. 4A and 4B illustrate one example of how aggregating background traffic according to the exemplary process of FIG. 3 may decrease RRC mode transitions, and therefore also decrease the network signaling and battery drain associated therewith. In FIG. 4A background traffic is illustrated across time in a case in which aggregation is not performed. Instances of generated background traffic that are received by the radio control unit 241 for purposes of being transmitted are indicated by solid circles with numerical identifiers, such as "$\bullet_5$". Without aggregation being performed, the radio control 241 processes the background traffic individually (including initiating any RRC mode transition that may be required), and causes the radio transceiver 242 to transmit the data packets as they are processed. The respective transmissions of these instances of background traffic are indicated by x's with corresponding numerical identifiers, such as "$x_5$". The state of the wireless device 110 is indicated by the line entitled RRC MODE, where the high state indicates the RRC Connected mode and the low state indicates the RRC Idle mode. When the first instance of background traffic (represented by $\bullet_1$) is received by the radio control unit 241 at timing $t_1$, the radio control unit 241 causes the wireless device to transition to the RRC Connected mode, and then directly thereafter the radio transceiver 242 transmits the background traffic (represented by $x_1$). After a time S (the Idle Tail time) has elapsed with no further activity, the wireless device 110 transitions back to the RRC Idle mode at timing $t_2$. Thereafter, a second instance of background traffic (represented by $\bullet_2$) is received by the radio control unit 241 at timing $t_3$, the radio control unit 241 causes the wireless device to transition to the RRC Connected mode, and directly thereafter the radio transceiver 242 transmits the background traffic (represented by $x_2$). As illustrated, seven transitions from RRC Idle mode to RRC Connected mode occur in order to transmit the first through tenth instances of background traffic that are illustrated.

The same instances of generated background traffic that are illustrated in FIG. 4A are also illustrated in FIG. 4B. However, in the case of FIG. 4B, aggregation is performed by the SBPDA 245. At timing $t_0$, when the wireless device enters the RRC Idle mode, the SBPDA 245 is initialized and a timer is set to zero. At timing $t_1$ the first instance of background traffic (represented by $\bullet_1$) is received by the radio control unit 241. The SBPDA 245 stores the first instance background traffic rather than transmitting it, and therefore the wireless device 110 remains in the RRC Idle mode. Similar events are illustrated for the second through ninth instances of background traffic, which are stored by the SBPDA 245 but are not transmitted immediately. At the timing $t_4$ the SBPDA 245 timer has reached the predetermined value T, and therefore at timing $t_4$ the SBPDA 245 is "flushed". That is, at timing $t_4$ the wireless device is transitioned to RRC Connected mode and all those instances of background traffic that have been stored by the SBPDA 245 (i.e., the first through ninths instances) are transmitted together by the transceiver 242. The tenth instance of background traffic (represented by $\bullet_{10}$) is received by the radio control unit 241 at the timing $t_5$, which is less than S after the ninth instance of background traffic is transmitted by the transceiver 242. Thus, the wireless device 110 is still in the RRC Connected state when the tenth instance of background traffic is received, and, accordingly, the tenth instance of background traffic is transmitted immediately (in this example, the SBPDA 245 does not perform aggregation on background traffic that is received when the wireless device 110 is already in the RRC Connected mode). At timing $t_6$, a time S has elapsed without any activity since the tenth instance of background traffic was transmitted, and therefore the wireless device transitions back to RRC Idle mode and the SBPDA 245 is again initialized and the timer reset to zero. As a comparison of FIGS. 4A and 4B indicates, in the illustrated example, only one transition from RRC Idle mode to RRC connect mode occurs in order to transmit the ten instances of background traffic when the SBPDA 245 performs aggregation, as compared to the seven RRC mode transitions that occur without aggregation.

The value of the parameter T may be controlled by the wireless device 110 itself. For example, a user of the wireless device 110 may be able to variably set a value of T, or an automatic aggregation time period routine stored in the memory 220 of the wireless device 110 may automatically variably set the value of T without user input based on current conditions. The communications unit 240 of the wireless device 110 may be configured to receive input regarding the parameter T from the processor 210 of the wireless device 110, and to alter the value of T accordingly. For example, the communications unit 240 may be a modular communications chipset configured for installation in a wireless device 110 by a wireless device manufacturer; the communications unit 240 may be pre-configured with interface instructions for receiving input from the processor of the wireless device regarding the parameter T, and the automatic aggregation time period routine (and/or other routines related to setting the parameter T) may be provided by the wireless device manufacturer. Increasing T would provide the advantage of providing greater battery life savings, since increasing T decreases the frequency of RRC mode transitions caused by background traffic. On the other hand, increasing T also increases the delay between background traffic transmissions, which may negatively affect the utility of some of the applications that are attempting to send the background traffic. For example, if T is set large then certain application updates (e.g., stock updates, news updates, social media updates) may not be sufficiently up-to-date to satisfy user desires. Thus, the automatic aggregation time period routine may desirably be configured to set the value of T so as to balance increased battery life (high T) against faster updates (low T). The value of T could be intelligently set by the automatic aggregation time period routine based upon current conditions, including current battery life, time of day, etc. For example, when battery life drops below a certain point, saving battery power may become a priority and T may be increased by the automatic aggregation time period routine. As another example, T could be set by the automatic aggregation time period routine to a larger value at times when having frequent updates to stay up-to-date may have low value (e.g., at night when many users are sleeping, the stock exchange is closed, etc.), and T could be set by the automatic aggregation time period routine to a lower value during times when frequent updates may be more desirable.

The parameter T may desirably be controlled by an operator of the network 120. The network operator may control the value of T by setting it at the time of provisioning of the wireless device 110 to the user. The network operator may also dynamically control the value of T via wireless communication over the network 120. For example, the network operator may occasionally send a wireless communication to the wireless device 110 that instructs the wireless device 110 what the value of T should be. The communications unit 240 of the wireless device 110 may be configured to receive and interpret such communications and to alter the value of T accordingly. This is advantageous in that it provides the network operator the ability to indirectly control the amount of network signaling resulting from background traffic by controlling a value of T, thereby allowing for the network operator to optimize usage of network resources. By setting T to a larger value, less network resources are utilized as a result of background traffic, since the amount of network signaling resulting from background traffic will decrease as T becomes larger. However, it may not be desirable to set T too large, since application performance—and therefore user satisfaction—may decrease as T becomes larger. The value of T can be intelligently set by the network operator based upon numerous considerations, including: current network conditions, usage history of the wireless device 110, a subscription status of a user of the wireless device 110, the time of day, etc. The network operator may set the value of T directly by inputting a value into a device of the network 120 (such as the MME) based upon the contemporaneous judgment of the network operator about current operating conditions. The network operator may also more desirably set the value of T indirectly by utilizing an automatic aggregation time period routine stored on one of the components of the network 120, such as the MME, to set the value of T. The communications unit 240 of the wireless device 110 may preferably be configured to accept as instructions for setting T only the instructions received from the network operator, thereby ensuring exclusive control of T for the network operator.

For example when the network is currently experiencing heavy traffic, it may be desirable from the perspective of the network operator to increase the value of T in order to free-up network resources. On the other hand, when the network is currently experiencing low traffic it may be acceptable to lower the value of T.

T may also be set by the network operator to different values based on the time of day. For example, it may be known in advance that certain time periods of the day are often high-traffic time periods, and therefore T may be automatically set to a higher value during these time periods without necessarily waiting to see if traffic actually becomes high.

Figure 5:
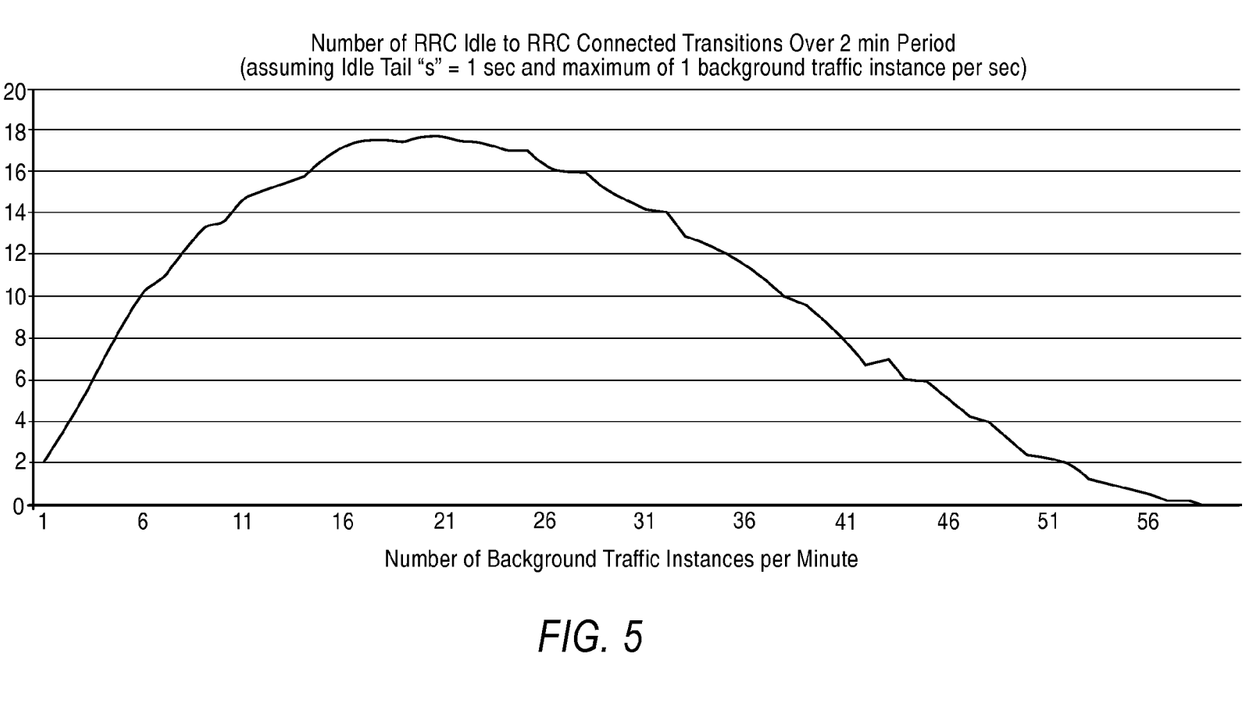
FIG. 5 illustrates results of an exemplary model of RRC Idle to RRC Connected transitions as a function of the number of instances of background traffic per minute.

The usage history of the wireless device 110 may also be taken into consideration by the network operator when setting the value of T. For example, the value of T may be based on the past volume of background traffic of a particular wireless device 110. As the volume of background traffic increases, the frequency of RRC Idle to RRC Connected transitions also increases, at least up to a certain point (eventually, further increases in background traffic volume begins to decrease the frequency of RRC Idle to RRC Connected transitions, since the wireless device 110 has fewer opportunities to transition back to the RRC Idle mode when background traffic is very frequently generated). Accordingly, a wireless device 110 with a history of a very low volume of background traffic (or a very high volume of traffic) may be assigned a relatively low value of T, since that particular wireless device 110 is not responsible for a large amount of network signaling associated with background traffic. FIG. 5 illustrates an exemplary model of a relationship between the number of RRC Idle to RRC Connected transitions occurring over a two minute time period as a function of the volume of background traffic (i.e., the average number of instances of background traffic occurring per minute) (in the model of FIG. 5 it is assumed merely for the sake of convenience that the Tail Time S is one second, that background traffic occurs irregularly, and that only one instance of background traffic can be generated per second). As another example, the value of T may be based on the past frequency of RRC Connection requests made by the wireless device 110 (irrespective of background traffic volume), with the value of T being set higher for those wireless devices 110 with more frequent RRC connection requests.

A subscription status of a user of a wireless device 110 may also affect the value of T—for example, users who pay a premium may have their value of T set lower than other users, allowing the premium subscribers to enjoy more frequent background traffic updating.

The value of T may also be controlled in part by the wireless device and in part by the network operator. For example, the network operator may define a lower limit of the value of T, but allow the wireless device to control the actual value of T as long as it is above the lower limit. The network operator may dynamically adjust the lower limit in the same manner discussed above with respect to setting the value of T.

As merely one illustrative example, when the value of the Idle Tail time S is on the order of seconds, a value of T may be desirably set on the order of minutes.

When the aggregation is performed at the radio level (for example, by the radio chipset controller) rather than, for example, at the application level, the effectiveness in reducing the frequency of RRC mode transitions is increased and the network operator can have increased control over the aggregation. Aggregation at the application layer involves establishing a proxy/client on the wireless device 110 to which the various applications send their connection requests. The proxy aggregates the requests over a period of time and then sends an aggregated request to the radio control for transmission. For example, multiple applications produced by a single application producer may be designed to aggregate their own respective background traffic at the application layer.

However, only the background traffic of applications specifically designed to utilize the particular proxy/client of the application-layer-aggregation is aggregated, and the background traffic of applications that do not utilize the proxy/client is transmitted normally. Thus, many applications may circumvent application-layer-aggregation simply by electing not to utilize the proxy, greatly reducing its effectiveness in diminishing network signaling resulting from background traffic. Indeed, there is an incentive for application producers to circumvent application-level-aggregation so that the background traffic from their application is not delayed, thereby increasing the performance of their application.

Furthermore, not only can certain applications circumvent the application-level-aggregation (resulting in increased network signaling), even those applications that are subjected to the application-level-aggregation may generate undesirable amounts of network signaling resulting from background traffic, since the application-level-aggregation generally has a relatively short time period for aggregation (recall that a shorter aggregation period results in more RRC mode transitions). The application producer that establishes the application-level-aggregation has an incentive to set the duration of a time period for aggregation relatively low in order to increase the performance of those applications that utilize the proxy/client. Moreover, application producers generally institute the application-level-aggregation for reasons other than reducing network load, and generally have less concern than network operators would like for the impact that decreasing a duration of an aggregation period may have on the network 120. In addition, when the aggregation is done at the application level, it may be difficult for the network operator to exert control over the duration of a time period for aggregation.

By implementing aggregation at the radio level, no applications may circumvent the aggregation process. Since all data that is transmitted by the wireless device goes through the communications unit 240, if an application wants any data to be transmitted it cannot circumvent the radio control unit 241 (which includes the SBPDA 245). Furthermore, as discussed above, the network operator can more easily control a value of T when the aggregation is performed at the radio level, thereby ensuring that network signaling resulting from background traffic is adequately diminished.

In general, computing systems and/or devices, such as the wireless devices 110 and various components of the network 120, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as the wireless devices 110 and various components of the network 120 generally include computer-executable instructions such as the instructions of the used to implement the SBPDA 245, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A communications apparatus comprising:
 a wireless transceiver configured to transmit data packets including background traffic data packets to a network, the background traffic data packets being related to at least one of a periodic message to keep alive a connection of an application to a remote server of the network, periodically reporting location information to the remote server, periodically requesting data from the remote server by the application, and periodically receiving data from the remote server by the application; and
 a transceiver control unit configured to receive, prior to their transmission, all data packets that are to be transmitted by the wireless transceiver and to control transmission by the wireless transceiver of the received data packets,
 wherein the transceiver control unit includes an aggregation unit that is configured to hold all background traffic data packets received by the transceiver control unit over an aggregation period, and to cause the wireless transceiver to wirelessly transmit the held background traffic data packets after the aggregation period has expired, the aggregation period having a predetermined maximum duration of T;
 wherein the transceiver control unit is configured to variably set a value of T in accordance with instructions received from a processor of a wireless device in which the communications apparatus is installed, the instructions being generated by the processor in accordance with at least one of a user input and an automatic aggregation time period routine based on at least one current condition including a current battery life of the wireless device and a subscription status associated with the wireless device; and wherein the transceiver control unit is configured to increase T when the battery life is below a predetermined level, and to set the value of T lower than T of another wireless device associated with a lower priority subscription status than that of the wireless device such that the wireless device transmits the held background traffic data packets more frequently than the another wireless device.

2. The communications apparatus of claim 1, wherein the communications apparatus is a wireless communications chipset configured to be included in the wireless device.

3. The communications apparatus of claim 1, wherein the transceiver control unit is further configured to variably set a value of T in accordance with instructions wirelessly received from the network.

4. The communications apparatus of claim 1, wherein the transceiver control unit is further configured to variably set a value of T within a range in accordance with instructions received from the processor of the wireless device in which the communications apparatus is included, at least a lower limit of the range being set in accordance with instructions wirelessly received from the network.

5. The communications apparatus of claim 1, wherein the aggregation period ends upon the earlier occurrence of:
   a time equal to T elapsing, and
   a data packet that is not a background traffic data packet being received by transceiver control unit.

6. The communications apparatus of claim 1, wherein the aggregation period ends upon the earlier occurrence of:
   a time equal to T elapsing,
   a data packet that is not a background traffic data packet being received by transceiver control unit, and
   an amount of the held background traffic data packets reaches a predetermined threshold.

7. The communications apparatus of claim 1, wherein when the aggregation period ends, the wireless transceiver wirelessly transmits the held background traffic data packets such that no transition to an RRC Idle mode occurs between transmission of a first one of the held background traffic data packets and transmission of a last one of the held background traffic data packets.

8. The communications apparatus of claim 1, wherein background traffic data packets are data packets generated not in response to specific contemporaneous user input.

9. A wireless device including:
   a processor;
   a memory unit configured to hold one or more applications that are executable by the processor, the applications when executed generating application data packets, including background traffic data packets, for transmission to a network, the background traffic data packets being related to at least one of a periodic message to keep alive a connection of the one or more applications to a remote server of the network, periodically reporting location information to the remote server, periodically requesting data from the remote server by the one or more applications, and periodically receiving data from the remote server by the one or more applications; and
   a communications unit comprising:
      a wireless transceiver configured to wirelessly transmit the application data packets to the network; and
      a transceiver control unit configured to receive, prior to their transmission, all application data packets that are to be transmitted by the wireless transceiver and to control transmission by the wireless transceiver of the received application data packets, the transceiver control unit including an aggregation unit that is configured to hold all background traffic data packets received by the transceiver control unit over an aggregation period, and to cause the wireless transceiver to wirelessly transmit the held background traffic data packets after the aggregation period has expired, the aggregation period having a predetermined maximum duration of T;
   wherein the transceiver control unit is configured to variably set a value of T in accordance with instructions received from the processor, the instructions being generated by the processor in accordance with at least one of a user input and an automatic aggregation time period routine based on at least one current condition including a current battery life of the wireless device and a subscription status associated with the wireless device;
   wherein the transceiver control unit is configured to increase T when the battery life is below a predetermined level, and to set the value of T lower than T of another wireless device associated with a lower priority subscription status than that of the wireless device such that the wireless device transmits the held background traffic data packets more frequently than the another wireless device.

10. The wireless device of claim 9, wherein the communications unit is a wireless communications chipset.

11. The wireless device of claim 10, wherein the transceiver control unit is further configured to variably set a value of T in accordance with instructions wirelessly received from the network.

12. The wireless device of claim 9, wherein the transceiver control unit is further configured to variably set a value of T within a range in accordance with instructions received from the processor, the instructions being generated by the processor in accordance with at least a lower limit of the range is set in accordance with instructions wirelessly received from the network.

13. A system comprising:
   a network configured to wirelessly communicate with at least one wireless device that includes a communications unit comprising:
      a wireless transceiver configured to transmit data packets including background traffic data packets to the network, the background traffic data packets being related to at least one of a periodic message to keep alive a connection of an application to a remote server of the network, periodically reporting location information to the remote server, periodically requesting data from the remote server by the application, and periodically receiving data from the remote server by the application; and
      a transceiver control unit configured to receive, prior to their transmission, all data packets that are to be transmitted by the wireless transceiver and to control transmission by the wireless transceiver of the received data packets, the transceiver control unit includes an aggregation unit that is configured to hold all background traffic data packets received by the transceiver control unit over an aggregation period, and to cause the wireless transceiver to wirelessly transmit the held background traffic data packets after the aggregation period has expired, the aggregation period having a predetermined maximum duration of T,
   wherein the network is configured to wirelessly transmit communications to the at least one wireless device that control a value of T for the at least one wireless device;
   wherein the transceiver control unit is configured to variably set a value of T in accordance with instructions received from a processor of the wireless device, the instructions being generated by the processor in accordance with at least one of a user input and an automatic aggregation time period routine based on at least one current condition including a current battery life of the at least one wireless device and a subscription status associated with the at least one wireless device;

wherein the transceiver control unit is configured to increase T when the battery life is below a predetermined level, and to set the value of T lower than T of another wireless device associated with a lower priority subscription status than that of the at least one wireless device such that the at least one wireless device transmits the held background traffic data packets more frequently than the another wireless device.

14. The system of claim 13, wherein the network is configured to variably control the value of T for the at least one wireless device based at least in part on current operating conditions of the network.

15. The system of claim 13, wherein the network is configured to variably control the value of T for the at least one wireless device based at least in part on a current time.

16. The system of claim 13, wherein the network is configured to variably control the value of T for the at least one wireless device based at least in part on a usage history of the at least one wireless device.

17. The communications apparatus of claim 1, wherein the transceiver control unit is also configured to transition from an RRC Idle mode to an RRC connected mode and cause the wireless transceiver to wirelessly transmit the held background traffic data packets after a memory area allocated for holding the background traffic exceeds a predetermined capacity.

18. The communications apparatus of claim 1, wherein the at least one current condition further includes the time of day.

* * * * *